US005244715A

United States Patent [19]

Kuchar

[11] Patent Number: 5,244,715

[45] Date of Patent: Sep. 14, 1993

[54] FLAG STRIP

[76] Inventor: David M. Kuchar, 239 Main St., Metuchen, N.J. 08840

[21] Appl. No.: 903,013

[22] Filed: Jun. 22, 1992

[51] Int. Cl.[5] ..................... B32B 9/00

[52] U.S. Cl. ..................... 428/195; 428/904.4; 428/201; 116/173; 116/174

[58] Field of Search ..................... 428/904.4, 201, 195, 428/209; 116/174, 174

[56] References Cited

U.S. PATENT DOCUMENTS

| | | | |
|---|---|---|---|
| 607,498 | 7/1898 | Wheeler | 428/43 |
| 715,884 | 12/1902 | Shuck | 40/604 |
| 1,116,942 | 11/1914 | Smith | 40/604 |
| 2,688,303 | 10/1950 | Leander | 116/173 |
| 3,219,010 | 11/1965 | Hyatt | 116/173 |
| 3,282,057 | 7/1961 | Prosser | 61/72.1 |
| 4,105,190 | 8/1978 | Curtis | 256/1 |
| 4,177,750 | 12/1979 | Scarlet | 116/173 |
| 4,623,282 | 11/1986 | Allen | 405/157 |
| 4,699,838 | 10/1987 | Gilbert | 428/201 |

*Primary Examiner*—Patrick J. Ryan
*Assistant Examiner*—Abraham Bahta
*Attorney, Agent, or Firm*—Dann, Dorfman, Herrell and Skillman

[57] ABSTRACT

A tape barrier composed of flexible material having generally parallel edges and substantially greater length than width has cuts made into the tape at intervals along the tape defining pennants. The pennants extend along the length of the tape and are separated from the tape by the cuts except at an end, which provides a continuing attachment to the tape, but allows them to fall vertically away from the tape when the tape is deployed generally horizontally. The result is to provide hanging pennants along the length of the tape. Preferably the cuts are perforations so that the pennants may be selectively torn away from the tape when put to use.

12 Claims, 1 Drawing Sheet

FLAG STRIP

The present invention relates to an improvement over ribbons or strips used to mark off work or hazardous areas. More specifically the present invention provides for flags or pennants to be formed by portions of the ribbon or strip in such a way that they dangle from the ribbon or strip and in some cases may be directed in the way they dangle.

BACKGROUND OF THE INVENTION

In the prior art it has become common to use tapes, ribbons or strips, usually of some sort of highly flexible resinous material, between elevated support positions to block passage of pedestrians or vehicles from a work area or other areas where hazards may exist. Commonly the tape material is brightly colored, frequently yellow or orange, and may additionally have some sort of cautionary message printed on the tape in contrasting colors, such as black. Frequently the word "caution" is repeated along the ribbon, for example. Thus, when the ribbon or tape serves as a barrier, the bright color aids in seeing it more readily, and the written message emphasizes that it is there to warn people not to enter the area beyond or to proceed cautiously. This type of tape or ribbon has become very popular because it is easy to handle and can be tied between existing structure and/or to posts temporarily installed.

The problem with this type of barrier is that it frequently looks not unlike temporary fencing so that people who are not being as observant as they might may miss the significance of the barrier.

An alternative more noticeable type of barrier in the past has been rope or narrow tape to which pennants have been sewn or otherwise secured. Such barriers may be more effective, but they are also more expensive to make and use. Since they are expensive, they may be saved for reuse after a job and may be awkward to store.

SUMMARY OF THE INVENTION

The present invention provides a single composite structure in the form of a flexible tape or ribbon which may be brightly colored and marked with "caution" or other words to visually give a warning as in the past. However, in addition it provides integral pennants or flags which dangle from the tape when it is held generally horizontally in place. The pennants or flags are integral and formed from the same tape. The pennants may be precut when the ribbon or tape is manufactured. However, the pennants are preferably formed by perforating the tape along lines defining the pennant in the course of manufacture. Then the tape can be used alternatively in conventional fashion or torn along the perforations to form the integral pennants or flags. The pennants may be cut in various shapes, either uniform or variable, along the length of the ribbon and may be all of the same type or size or may be of different types or sizes. Additionally, single larger holes may be punched at the ends of perforated lines and may help to quickly identify the tear line and also to help confine the tears to the perforated areas. Additional holes along an edge of the tape from which the pennant is cut may help to determine the fold line along which the pennant or flag folds in falling from the ribbon.

More specifically, the present invention concerns a tape barrier display or warning in which a tape of flexible material having generally parallel edges and substantially greater length than width is employed. Cuts are made into the tape at selected intervals along the tape defining pennants which extend generally along the length of the tape. The cuts may be completed cuts so that the pennants are free to fall away from the tape. More frequently, it is anticipated the cuts will be perforations which enable the pennants to be separated from the tape by tearing along the perforations. When the tape is deployed generally horizontally the pennants will fall vertically so as to provide hanging pennants along the length of the tape.

BRIEF DESCRIPTION OF THE DRAWINGS

For a better understanding of the invention, reference is made to the following drawings in which.

SPECIFIC DESCRIPTION OF THE INVENTION

Figure 1:
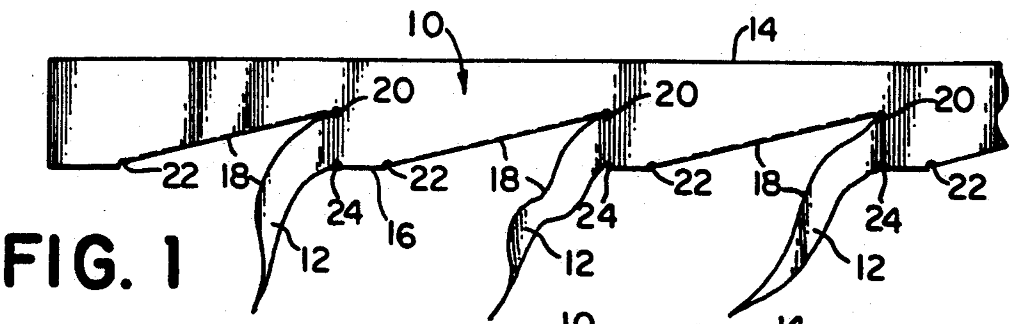
FIG. 1 illustrates a preferred tape with integral pennants along an edge of the tape partially detached from the generally horizontally tape and dangling generally vertically.

Referring to FIG. 1, there is shown a tape or ribbon 10 which is formed of some thin, flexible material. The material is preferably resinous, such as polyethylene, or any number of synthetic materials, but could be paper or cloth of woven or unwoven type. The tape in use is secured at elevated support posts periodically to hold it in generally horizontal position. Support, for example, may be from a permanent fence or wall or a temporary post or pole, which may have a self-supporting base or may be driven into the ground. The tape 10 is capable of being tied to the support avoiding the need for special attachment means. Of course, loops, hooks, clips or other appropriate support for the tape may also be used.

As in the past, the tape may be colored a bright eye-catching color, such as yellow, to indicate caution. It may be marked repeatedly with words such as "caution" or "danger" along the tape preferably in contrasting color of print, such as black.

In accordance with the present invention the tape is provided with integral flags or pennants 12 along its bottom edge 16. These are formed by cutting diagonal slits 18 from the bottom edge inwardly into the tape at a small angle so as to leave a substantial proportion of the tape width to upper edge 14 uncut to support the tape and pennants when hung. The resulting flag or pennant 12 will dangle from the tape as determined by gravity so that the results will be to provide a plurality of flags or pennants along the tape for as long as the tape extends. Flags or pennants not only change the appearance of the barrier into a more eye catching form, but also provide means which may be more readily and noticeably moved by a wind or breeze. The substantially uncut portion of the tape inward from the upper edge 14 serves to provide the continuity to allow the tape to be strung from support to support and held generally horizontally. When so strung it provides a lightweight barrier which will serve as a warning to persons approaching a work site or accident that the immediate area is to be avoided.

The tape 10 may be manufactured with the pennants completely cut in the tape and the tape rolled upon a spool or into a self-supporting spiral for convenient storage and packaging prior to sale. Part of the concept is to provide material which is sufficiently inexpensive that it may be readily disposable without worry about expense once a job is done. This invention permits continuous manufacture of a ribbon or strip with the slits forming the pennants, automatic rolling and packaging so as to provide a very inexpensive product. In use the product is simply unrolled, attached to various vertical supports and strung horizontally as a warning. If desired, it can be re-rolled into a spiral package after use and retained for further use, but it should be sufficiently inexpensive to warrant disposal into trash after use.

Figure 2:
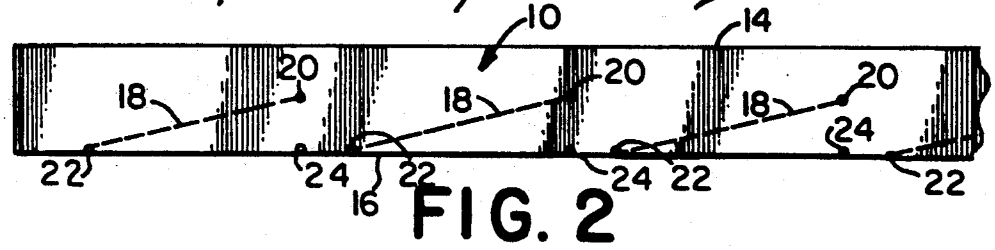
FIG. 2 shows the tape of FIG. 1 before the perforated tape has been torn to separate the pennants.

FIG. 2 illustrates a tape of the pattern used in the structure of FIG. 1 wherein the ribbon 10 is merely perforated along similar diagonal lines extending from what would then become the bottom edge 16. Of course, designation of the bottom edge is arbitrary and the ribbon could be used in the other direction, but a greater length of pennant is obtained by using the edge 16 as the bottom edge and the upper edge 14 is then adjacent a continuous portion of the ribbon which has not been cut or perforated. In addition to perforation along the lines 18 the ribbon may also be perforated at the interior end of those lines in a punched hole 20 and along edge 16 in a punched hole 22. These holes quickly identify the tear line and hole 20 tends to limit tear of the ribbon to the punched hole. An additional punched hole 24 along bottom edge 16 helps creation of a fold line for the pennant 12 between it and hole 20.

The perforations should be of a type which make tearing relatively easy while normally retaining the integrity of the tape so that it can be more easily handled until its time of use. At that time, each pennant is formed by tearing along the perforations 18 between the holes 22 and 20. Tearing can be done after the ribbon is deployed in horizontal position or prior to that time, as desired. One advantage of providing the ribbon with perforations instead of precut pennants is to allow discretion in the user as to whether pennants are needed in a particular location. It also allows discretion as to the number of pennants actually used, and it may be that not all of the pennants will need to be used in a particular situation. In some cases perhaps only every other pennant would be used, for example, or pennants in the area of support might not be used.

Figure 3:
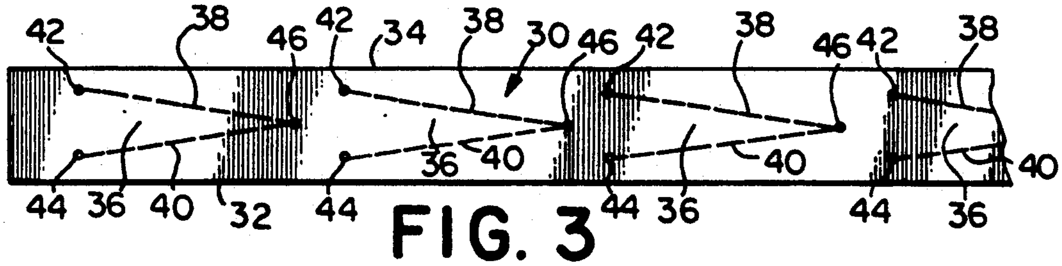
FIG. 3 illustrates an alternative form of perforated tape producing triangular pennants.

FIG. 3 illustrates that it is not necessary to have the pennants begin at an edge of the tape. Tape 30 has edges 32 and 34, which are continuous and parallel throughout their length. Pennants 36 are formed within the tape and terminate well away from each edge. In such event it is possible to provide either triangular pennants, as shown, or rectangular pennants, or pennants with various curved shapes. The triangular pennants are provided by perforating along converging lines 38 and 40 to aid in initiating tearing and confine the tearing to designated areas. The ends of the tear lines can be defined by punched holes 42, 44 and 46. Pennants formed in this manner will be somewhat more difficult to tear out and deploy and have the disadvantage that they do not hang from the bottom edge so that they overlap part of the tape and do not appear to be as long as their actual length.

Figure 4:
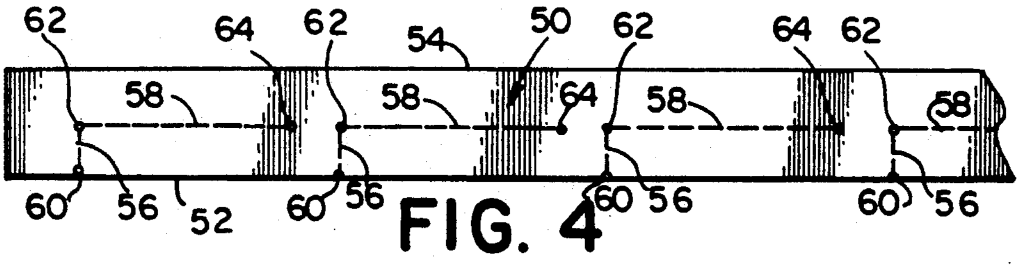
FIG. 4 illustrates pennants of a different form formed along the edge of a tape.

FIG. 4 provides a variation wherein a strip or ribbon 50 is perforated in a manner to provide rectangular pennants or flags, as opposed to triangular pennants as in the other example. In this case, the pennants are again formed by perforations extending from the bottom edge 52. However, in this case there are perforations 56, generally perpendicular to the edges 52 and 54, joining perforations 58 parallel to the edges 52 and 54. Again, punched holes are employed. Holes 60 are along the bottom edge 52, hole 62 at the junction of the perforations 56 and 58 and hole 64 at the end of the perforations 58. A further punched hole (not shown), of course, might be added to help establish the fall line as in the triangular pennants of FIGS. 1 and 2. The pennants are formed by tearing along the perforation line 56 to hole 62 and then along the perforation line 58 to hole 64. Of course, variations could also be made by making any perforation line sinuous or curved in some way.

Figure 6:
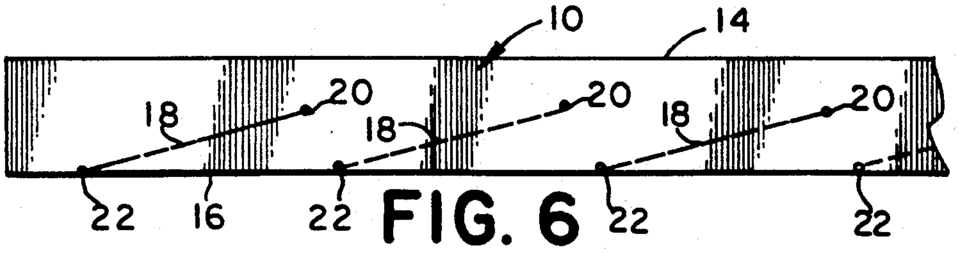
FIG. 6 is a tape very similar to that of FIG. 1, but omitting certain punched holes.

FIG. 6 will be recognized as a minor variation of the structure of FIG. 2 which omits punched holes 24. The same numbers are used to designate similar parts as in FIG. 2. Instead of placing a punched hole 24 immediately below the hole 20, hole 24 is omitted so that the fold line tends to extend diagonally between holes 20 and 22.

Figure 5:
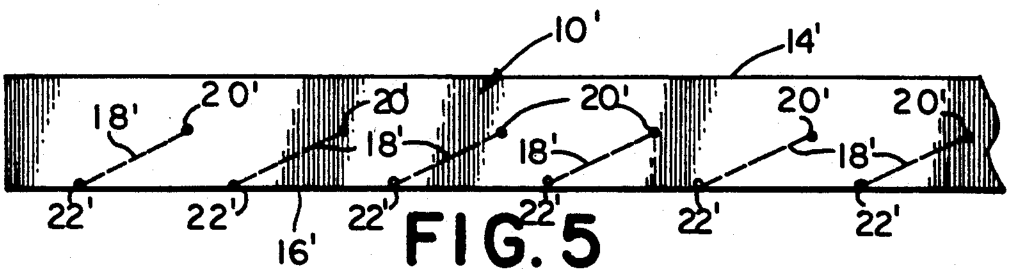
FIG. 5 shows an alternative tape arrangement for pennants in which pennants provided are more closely spaced to one another, but somewhat shorter.

FIG. 5 is still another variation on the embodiment of FIGS. 2 and 3 wherein the pennants are smaller but more numerous because of their size and the shorter spacing provided along the lower edge. In this case, similar parts are numbered the same as in FIGS. 1 and 2 with the addition of primes.

The present invention has been described in terms of specific embodiments. Other embodiments will occur to those skilled in the art. All such variations and modifications of the invention within the scope of the claims are intended to be within the scope and spirit of the present invention.

I claim:

1. A tape barrier display or warning comprising:

a tape of flexible material having generally parallel edges and substantially greater length than width, and cuts made into the tape at selected intervals along the tape defining pennants which extend generally along the length of the tape which may be separated from the tape along the cuts except at an end to fall vertically away from the tape when the tape is deployed generally horizontally so as to provide hanging pennants along the length of the tape.

2. The tape of claim 1 in which the pennants are formed by diagonal cuts beginning at one edge of the tape.

3. The tape of claim 1 in which the pennants are formed by cuts extending generally transverse to the tape and then generally parallel to the tape so that a generally rectangular pennant is formed.

4. The tape of claim 1 in which the cuts are provided along diagonal lines converging within the tape and not extending to either edge whereby pennants are formed within the body of the tape.

5. The tape of claim 1 in which the cuts are perforations which can easily be torn to free the pennant.

6. The tape of claim 5 in which a hole is provided at the end of the perforation to help limit tearing along the line of perforations.

7. The tape of claim 6 in which a hole is also placed at any position along the perforation in which the perforation changes direction.

8. The tape of claim 6 in which a hole is also placed along the edge of the tape at the place where perforation starts to help locate the perforations.

9. The tape of claim 6 in which an extra hole not on a perforated tear line is located along the bottom edge of the tape so that the holes help define a fold line for the pennant.

10. The tape of claim 2 in which the cuts are perforations which can easily be torn to free the pennant.

11. The tape of claim 3 in which the cuts are perforations which can easily be torn to free the pennant.

12. The tape of claim 4 in which the cuts are perforations which can easily be torn to free the pennant.

* * * * *